United States Patent [19]

Shurtz, II et al.

[11] Patent Number: 4,712,881

[45] Date of Patent: Dec. 15, 1987

[54] BIREFRINGENT ARTIFICIAL DIELECTRIC STRUCTURES

[75] Inventors: Richard R. Shurtz, II, Oakton, Va.; Edward J. Sharp, Fort Washington, Md.

[73] Assignee: The United States of America as represented by the Secretary of the Army, Washington, D.C.

[21] Appl. No.: 747,214

[22] Filed: Jun. 21, 1985

[51] Int. Cl.$^4$ .......................... G02B 5/30; G02B 27/28
[52] U.S. Cl. ..................................... 350/406; 350/1.1; 350/1.7; 350/400; 350/404
[58] Field of Search ................. 350/406, 400, 1.1, 1.7, 350/404, 320

[56] References Cited

U.S. PATENT DOCUMENTS 4,289,381  9/1981  Garvin et al. ....................... 350/320
4,657,350  4/1987  Mori .................................... 350/400

OTHER PUBLICATIONS

Kock, W. E., "Circular Polarization in Certain Laser and Holography Applications", *Applied Optics*, vol. 14, No. 7, Jul. 1975, pp. 1471-1472.

Evans, J. W., "Sole Birefringent Filter", *Journal of the Optical Society of America*, vol. 48, No. 3, Mar. 1958, pp. 142-145.

"Infra-Red Grid Polarizers", *Manufacturing Optician International*, vol. 21, No. 12, Jun. 1969, p. 660, (No author named).

Romero, H. V., et al, "Far Infrared Filters for a Rocket-Borne Radiometer", *Applied Optics*, vol. 11, No. 4, Apr. 1972, pp. 873-880.

*Primary Examiner*—John K. Corbin
*Assistant Examiner*—David J. Edmondson
*Attorney, Agent, or Firm*—Max L. Harwell; Aubrey J. Dunn; Anthony T. Lane

[57] ABSTRACT

A metallic pattern is applied to a dielectric substrate to form the inventive device. The pattern is a mesh or array of islands with two-fold symmetry, i.e., bisymmetrical but with unequal orthogonal dimensions. Lamination of the devices may be formed to make various types of waveplates and filters.

3 Claims, 6 Drawing Figures

BIREFRINGENT ARTIFICIAL DIELECTRIC STRUCTURES

The invention described herein may be manufactured, used, and licensed by the U.S. Government for governmental purposes without the payment of any royalties thereon.

BACKGROUND OF THE INVENTION

This invention is in the field of infrared birefringent materials, and structures which may be made to exhibit birefringent properties. By definition, a birefringent material is one that exhibits optical properties which depend upon the polarization of an input radiation field. This usually means that the optical index of refraction, as seen by an electro-magnetic wave propagating through the material, depends upon the orientation of the electric field vector. Unfortunately, the number of materials which exhibits a high degree of such birefringent is limited, particularly in the 8–13 micron wavelength region of the electromagnetic sprectrum, where optically active transparent materials are rare. Birefringent materials can be used to fabricate wide field-of-view, narrow bandwidth filters. They can be used to rotate the polarization of an input field or to convert circular polarization to plane polarization and vice versa. In each of these cases, the material must produce a low insertion loss, i.e., transmit the input wavelength with low absorption, while at the same time exhibiting a large optical asymmetry. There are few naturally occuring materials which possess all of these properties. Some of the best candidates are listed below along with their shortcomings. In the visible region, lithium niobate and lithinum tantalate are transparent; but, since their birefringence is not large, a large optical path length is required to produce a usable effect. Tungsten bronze type crystals, such as strontium barium niobate, can be used from the visible region out to seven microns, can be grown in large optical quality crystals, but suffer limited birefringence. Chalcopyrite type crystals, which transmit in the 8–13 micron region, possess limited birefringence and are not available in large optical quality sizes. Finally, sapphire is the best choice for the millimeter wave to infrared region, barring the areas where vibrational resonances occur. Like those listed previously, it also suffers from a small optical asymmetry.

In view of the severe lack of available materials, it is clearly desirable to develop techniques which would allow the fabrication of a medium which possesses artificially generated birefringent properties. We have invented such materials and call them birefringent artificial dielectrics.

SUMMARY OF THE INVENTION

The invention is an essentially two-dimensional birefringent artificial dielectric device in the form of either an array of metal mesas or a metal mesh on a transparent dielectric substrate. The pattern is bisymmetrical, but with unequal orthogonal dimensions. Also, the invention includes filters made from laminations of the device.

DESCRIPTION OF PREFERRED EMBODIMENTS OF THE INVENTION

Figure 1:
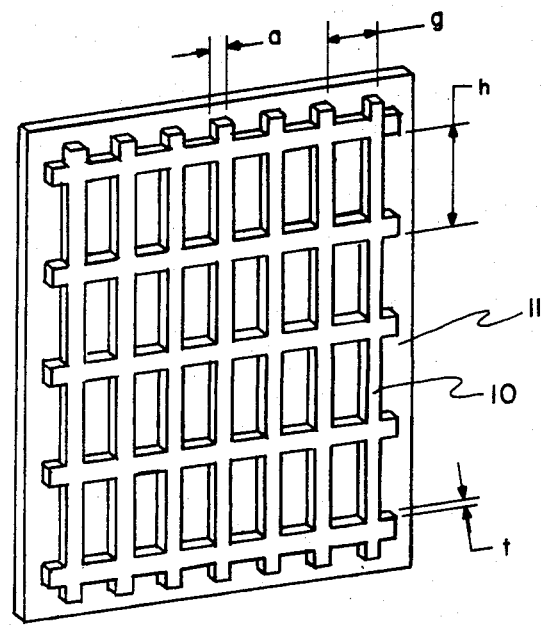
FIG. 1 is an isometric view of one embodiment of the inventive device.

An artificial dielectric device formed in accordance with our invention may take any of several forms, but all the forms have certain common features. In particular, the device is formed of a planer metallic pattern on a transparent substrate. The pattern may be a grid or screen with two-fold symmetry, or a regular array of mesas or islands with such symmetry. The feature size and spacing of the pattern is small compared to input radiation wavelength, in order to avoid diffractive effects. Two-fold symmetry, as used herein, means bisymmetrical, but with unequal orthogonal dimensions. Examples of figures with such symmetry are: rectangles, ellipses, ovals, irregular octagons (rectangles with the corners clipped off), diamonds, etc. In general, an artificial dielectric device is birefringent if its periodic structure (pattern) exhibits two-fold rather than four-fold symmetry about the axis normal to the pattern plane. Odd-order and higher even-order symmetries are not considered because they mix the two polarizations through non-orthogonal mode coupling within the aperture. The general properties of a pattern may be conveniently described using circuit theory. Incoming radiation creates an electromagnetic aperture field distribution (which satifies the appropriate boundry conditions) within the open areas of the pattern. The aperture fields induce conductive currents around the peripheries of the pattern elements, and displacement currents across the elements. In the case of a pattern of rectangular openings, the equivalent circuit for a four-terminal network is the parallel connection of an inductor and a capacitor between network input and output terminals. For a pattern of rectangular mesas or islands, the equivalent circuit is the series connection of an inductor and a capacitor between such input and output terminals. Obviously, other two-fold symmetrical patterns will have equivalent circuits corresponding to one or the other of these equivalent circuits. The input impedance of the equivalent circuit, combined with transmission line theory, is used to predict the amplitude and phase of the reflected and transmitted waves. If the input impedance of the periodic structure is adjusted to match the 377 ohm impedance of free space, all radiation is forward scattered after undergoing an appropriate phase shift. This phase shift is much the same as that caused by a bulk dielectric, where it is viewed as a velocity reduction effect and described by an index of refraction. In actual practice the impedance would be selected to produce the appropriate reflectance, given by $(Z_o - Z_m)^2/(Z_o + Z_m)^2$, where $Z_o$ is the impedance of free space and $Z_m$ is the input impedance of the mesh.

A circuit resonance, if present, is analogous to an electrical resonance in a real dielectric, such as that caused by an atomic, vibrational, or bandgap transition.

In a practical device, such a resonance cannot be too close to the operational wavelength because the diffraction condition, described below, may be violated and because the mesh becomes too lossy as the reactive portion of the impedance vanishes and the resistive portion dominates.

Figure 2:
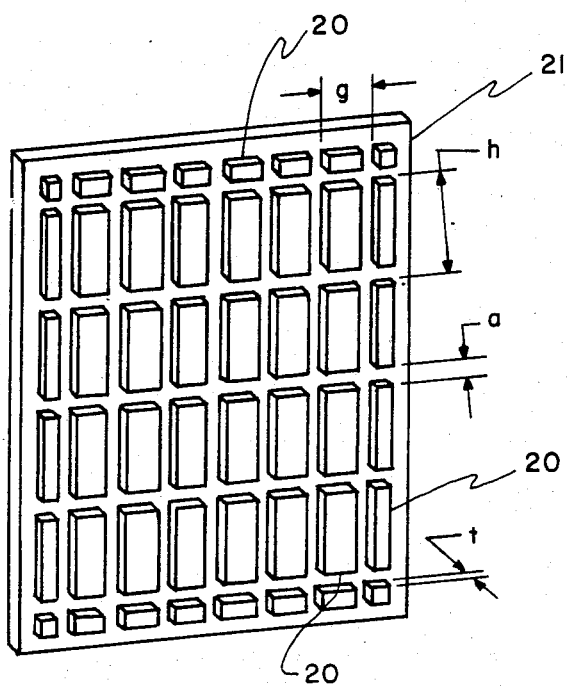
FIG. 2 is an isometric view of another embodiment of the inventive device.

Referring now to the drawings, FIG. 1 shows an embodiment of the inventive device wherein the metallic pattern is a grid or mesh 10 on transparent substrate 11. This pattern is primarily inductive in nature, i.e. the inductance of the equivalent circuit is greater than the capacitance thereof. FIG. 2 is a capacitive pattern of metallic mesas or islands 20 on transparent substrate 21. Both the FIGS. 1 and 2 devices are birefringent, since they have two-fold symmetry, (g and h are unequal) such that orthogonal components of a traverse electric field encounter different aperture modes of oscillation. In other words, two input polarizations can excite two independent equivalent circuits. If g and h were equal, the patterns would be isotropic.

Figure 3:
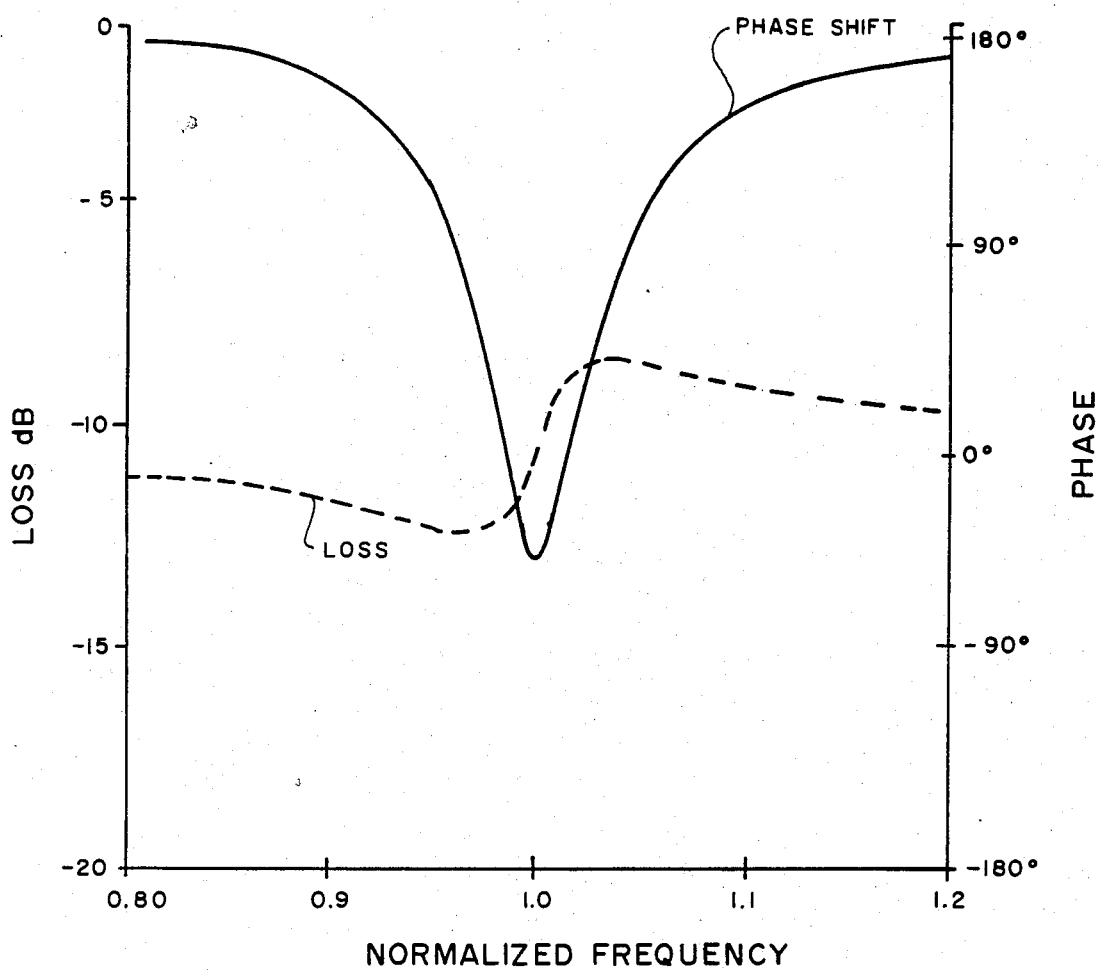
FIG. 3 shows graphs of loss and phase shift vs normalized frequency for radiation transmitted through a FIG. 1 or FIG. 2 device.

In FIG. 3, the dotted line shows loss through a FIG. 1 or FIG. 2 device, and the solid line shows phase shift (both lines plotted against normalized frequency). Normalized frequency is the particular frequency being applied to the device divided by the resonant frequency of the device. The 1.0 point thus represents resonant frequency, points to the left of 1.0 are below resonant frequency, and those to the right of 1.0 are above resonant frequency.

Some general guidelines for construction of our device are as follows: the pattern is made of a highly conductive metal, such as gold or silver. The pattern is formed using standard photo-lithographic techniques with particular attention paid to surface smoothness to keep skin losses to a minimum. Reactive sputter etching techniques are quite applicable because of the smooth edge definition they produce. The pattern can be placed on any substrate which is transparent to the input wavelength. For example: polymers, quartz, or glasses in the visible/near infrared; germanium, zinc selenide, calcium fluoride, or zinc telluride in the 8-12 micron region: or rexolite, TPX or saphire in the millimeter wave region. In order to keep the wavelength in the substrate as large as possible to permit a larger pattern unit cell, the substrate index of refraction should be minimized. The back surface of the substrate should be anti-reflection (AR) coated to facilitate impedance matching to free space for single mesh structures. For more complicated designs both the front and back surface of the substrate can be covered with the pattern, eliminating the need for such an AR coating. In order for an artificial dielectric to avoid diffraction effects, the unit cell dimensions must be on the order of $2\lambda/3\eta$ or less, where $\lambda$ is wavelength and $\eta$ is the substrate index of refraction. If this is not the case, the structure will diffract at the Bragg angle just as X-rays are diffracted by real dielectrics when the radiation wavelength is the same order as the unit cell.

Typical pattern dimensions and materials for a birefringent mesh are listed in Table 1. The larger unit cell dimension, g, is based on the diffraction limit and assumes the smaller wavelength in the range. The smaller unit cell dimension, h, is set arbitrarily at 0.75 g as an example of a typical value. The conductor width, a, is selected to be one tenth of h. The mesh thickness, t, should exceed approximately two optical skin depths in order to behave like a metal. A high conductivity metal, gold, was chosen for the mesh, a fact which is particularly important in the high frequency range where plasma resonance effects (i.e. plasmons) make the metal lossy. It should be noted that this plasmon effect, the second high frequency limit encountered by the technology, usually occurs at frequencies higher than the diffraction limit discussed above.

TABLE I

| Parameter | .5-1 μm | 3-5 μm | 8-12 μm | 1 mm |
|---|---|---|---|---|
| Substrate Material | Glass | $CaF_2$ | $CaF_2$ | TPX |
| Sub. Index of Refraction | 1.5 | 1.4 | 1.3 | 1.5 |
| Pattern Conductor | Au | Au | Au | Au |
| g (μm) | .2 | 1.4 | 4.1 | 450 |
| h (μm) | .15 | 1.0 | 3.0 | 330 |
| a (μm) | .02 | .14 | .41 | 45 |
| t (Angstroms) | 500 | 1000 | 2000 | 10000 |

Table 1 clearly shows that the dimensional requirements of this technology constrain its use to three microns or greater if conventional deep UV photo-lithography is used. If e-beam lithographic techniques are applied, however, these concepts may be useful in the visible. The most attractive application ranges, in terms of the ease of fabrication and the lack of optical active materials, are the 8-12 micron and 1 millimeter ranges.

One application of this birefringement device is a quarter wave plate, which shifts the phase of one polarization by 90 degrees relative to a second. The device converts circular polarization to plane polarization and vice versa. A second application is a half wave plate, which shifts the phase of one polarization relative to the second by 180 degrees. This half wave plate device also rotates the polarization of the input wave by 90 degrees. It can be formed by stacking two quarter wave plates. In realizable mesh structures, a 90 degree phase shift with only one mesh is difficult to achieve. If we assume a circuit Q of 30, the phase shift difference between two polarizations and the insertion loss of a single mesh, composed of asymmetric dipoles, are shown in FIG. 3.

Figure 4:
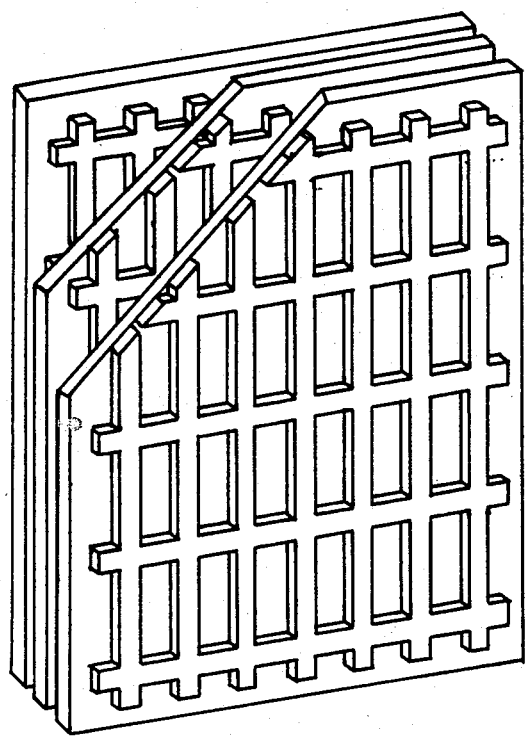
FIG. 4 is an isometric view (partially cut away) of a filter made by stacking FIG. 1 devices.
Figure 5:
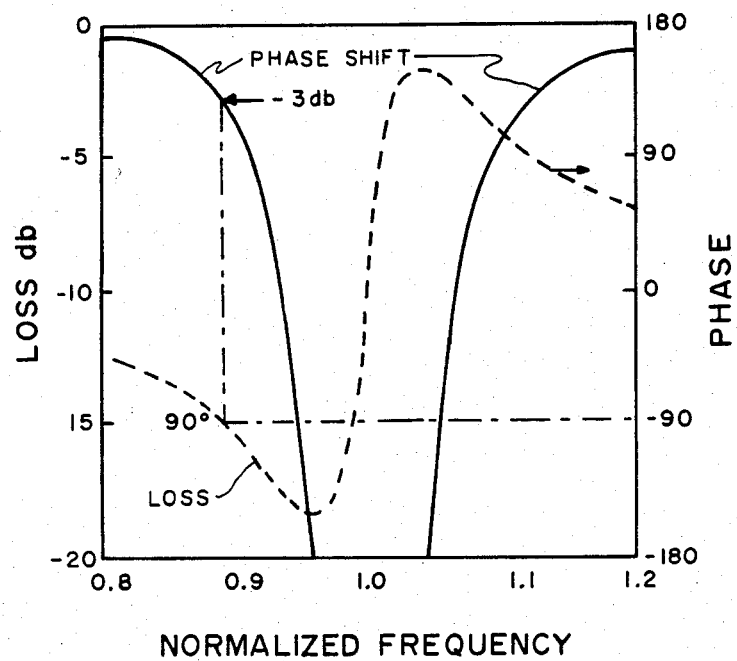
FIG. 5 shows graphs of loss and phase shift vs normalized frequency for radiation transmitted through the FIG. 4 filter.

Large phase shift differentials can be obtained by stacking a series of metal meshes, each providing a portion of the required phase shift. An example of such a device, with three layers, each with a Q of 30, spaced at quarter-wave intervals, is shown in FIG. 4. The phase shift difference and the insertion loss of such a device are shown in FIG. 5. If we had assumed a circuit Q of 100, the insertion loss in this configuration would have dropped to 1 db. A key issue in such stacked structures is clearly the conductive loss introduced by each mesh. Thus the real trade-off in designing such devices involves insertion loss versus phase shift and bandwidth.

Figure 6:
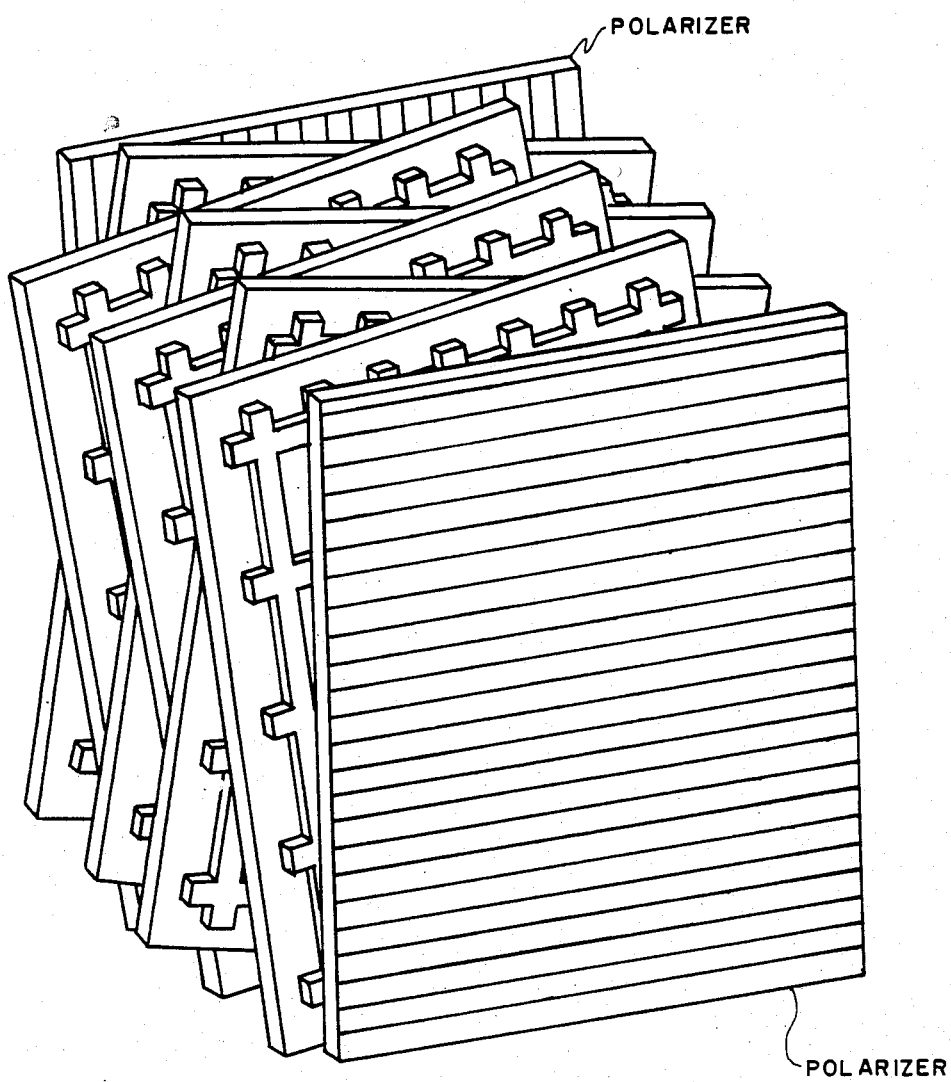
FIG. 6 is an isometric view of a six-stage folded Solc filter made by stacking FIG. 1 devices.

A third application of the birefringent mesh is a narrow-band, wide field-of-view filter. Birefringent artificial dielectric mesh structures can be stacked to fabricate Lyot-Ohman or Solc filters, by spacing oriented meshes at appropriate intervals. The Solc filter can be either in a fanned or folded configuration. We illustrate the application of artificial dielectrics to these filters using the folded Solc, shown in FIG. 6. Any birefringent mesh is suitable for filter applications. Because of the mesh skin resistance problem, the critical trade-off in all these filters is bandwidth (i.e. number in the stack) versus insertion loss.

We claim:

1. An artificial dielectric device for electromagnetic radiation, composed of a regular planar pattern of highly-conductive metal film on an insulating and transparent substrate, wherein said pattern comprises cells with two-fold symmetry about an axis normal to the plane of said pattern, wherein said device is birefringent to said radiation.

2. The artificial dielectric device as set forth in claim 1 wherein said pattern is a mesh, and said cells are the openings in said mesh.

3. The artificial dielectric device as set forth in claim 1 wherein said pattern is an array of mesas, and said cells are said mesas.

* * * * *